United States Patent
Fujikawa

(10) Patent No.: US 8,144,268 B2
(45) Date of Patent: Mar. 27, 2012

(54) DISPLAY DEVICE

(75) Inventor: Akihiro Fujikawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1001 days.

(21) Appl. No.: 12/112,246

(22) Filed: Apr. 30, 2008

(65) Prior Publication Data

US 2008/0278039 A1 Nov. 13, 2008

(30) Foreign Application Priority Data

May 8, 2007 (JP) ................................. 2007-123260

(51) Int. Cl.
*H04N 5/64* (2006.01)

(52) U.S. Cl. ......................... 348/843; 348/839; 312/7.2

(58) Field of Classification Search ............. 52/836, 52/837, 838, 839, 840, 841, 842, 843; 312/7.2; 349/58; 348/836, 837, 838, 839, 840, 841, 348/842, 843
See application file for complete search history.

(56) References Cited

U.S. PATENT DOCUMENTS

| | | | | |
|---|---|---|---|---|
| 5,455,743 A * | 10/1995 | Miyajima | ..................... | 361/781 |
| 5,573,317 A | 11/1996 | Cavanaugh et al. | | |
| 5,623,393 A * | 4/1997 | Yau | ......................... | 361/679.21 |
| 5,737,039 A * | 4/1998 | Lopez et al. | .................. | 348/836 |
| 5,742,359 A * | 4/1998 | Han | .............................. | 348/836 |
| 5,742,360 A * | 4/1998 | Kwon et al. | .................. | 348/839 |
| 5,867,235 A * | 2/1999 | Hasegawa | ........................ | 349/58 |
| 6,536,621 B2 * | 3/2003 | Yokobori | ..................... | 220/4.02 |
| 6,770,824 B1 * | 8/2004 | Faucher | ........................ | 200/5 A |
| 7,224,816 B2 * | 5/2007 | Naito et al. | ................... | 381/388 |
| 7,826,634 B2 * | 11/2010 | Soga | ............................. | 381/345 |
| 2003/0122993 A1 * | 7/2003 | Eiraku et al. | .................... | 349/58 |
| 2007/0023270 A1 | 2/2007 | Watanabe | | |
| 2010/0240957 A1 * | 9/2010 | Abrams | ........................ | 600/201 |

FOREIGN PATENT DOCUMENTS

| | | |
|---|---|---|
| EP | 1 613 070 A | 1/2006 |
| JP | 2003-43944 A | 2/2003 |

* cited by examiner

*Primary Examiner* — Branon Painter
(74) *Attorney, Agent, or Firm* — Global IP Counselors

(57) ABSTRACT

A display device includes a display screen, a front cabinet, a rear cabinet and a switch member. The front cabinet has a pair of front supporting portions. Each of the front supporting portions has a threaded hole. The rear cabinet has a pair of rear supporting portions. Each of the rear supporting portions has a first through hole. The switch member is fixedly coupled between the front cabinet and the rear cabinet with screws and has a pair of brackets. Each of the brackets has a second through hole, and is sandwiched between each pair of the front supporting portion and the rear supporting portion. The screws are inserted through the first through holes of the rear supporting portions and the second through holes of the brackets and threaded into the threaded holes of the front supporting portions.

10 Claims, 5 Drawing Sheets

DISPLAY DEVICE

CROSS-REFERENCE TO RELATED APPLICATIONS

This application claims priority to Japanese Patent Application No. 2007-123260 filed on May 8, 2007. The entire disclosure of Japanese Patent Application No. 2007-123260 is hereby incorporated herein by reference.

BACKGROUND OF THE INVENTION

1. Field of the Invention

The present invention generally relates to a display device. More specifically, the present invention relates to a display device having a switch member.

2. Background Information

A conventional display device includes a display screen, a front cabinet, a rear cabinet and a switch member. The front cabinet is disposed to surround the display screen. The switch member is disposed between a top face of the front cabinet and a top face of the rear cabinet. The switch member switches operations of the power supply or the display screen.

The switch member is formed from a synthetic resin. The switch member has a trapezoidal switch member main body, a hollow cylindrical component and a pair of brackets. The switch member main body is equipped with a plurality of switches. The cylindrical component protrudes from a center of the switch member main body toward the rear cabinet. The brackets protrude laterally from both side edges of the switch member main body.

A recess is formed at an edge of the rear cabinet opposite the front cabinet. The recess is substantially the same shape as, but larger than, the switch member main body. When the rear cabinet is abutted against the front cabinet, the recess mates with the switch member main body.

The switches have a plurality of elastically deformable push tabs. The push tabs are produced by forming a plurality of substantially U-shaped slits at a specific spacing in the switch member main body. A printed wiring board is screwed to a rear face of the switch member main body. The printed wiring board includes tact switches formed at a location opposite the push tabs. The display screen or the power supply is switched by pushing one of the push tabs to operate one of the tact switches.

A ledge is formed opposite and substantially parallel to the front cabinet by bending an outer peripheral part of the rear cabinet. A first screw insertion hole is made in a bottom of a recess formed at a location of the ledge that faces the cylindrical component.

Each of the brackets includes a second screw insertion hole and annular protrusions. The second screw insertion holes are made in centers of the brackets. The annular protrusions are larger in diameter than the second screw insertion holes. The annular protrusions are formed integrally protruding from both sides of the brackets and centered around the second screw insertion holes. A pair of bottomed cylindrical legs is provided integrally protruding from the front cabinet. The bottomed cylindrical legs support the brackets by having distal ends fitted into the annular protrusions.

The assembly procedure will now be described. The brackets of the switch member are placed on the legs. Screws are threaded through the second screw insertion holes of the brackets and into the holes of the legs to fix the switch member to the front cabinet. Then, the rear cabinet is grasped and the recess is mated with the switch member main body so that the rear cabinet is abutted against the front cabinet. Then, a screw is threaded through the first screw insertion hole in the recess and into the hole of the cylindrical component to fasten the rear cabinet to the front cabinet.

With the conventional display device, since the two screws are threaded clockwise in order to fix the brackets of the switch member, the switch member is pushed by heads of the screws and budged away from original position to the right side of the display device. Thus, when the rear cabinet is abutted against the front cabinet in this state, the left and right gaps between the switch member main body and the recess of the rear cabinet will not be even. Therefore, the aesthetic appearance of the display device is adversely affected.

Also, three of the screws are required to fasten the rear cabinet and the switch member to the front cabinet. Since many of the screws end up being used, the manufacturing cost increases. Furthermore, threading the screws also takes time and effort. Thus, the work efficiency becomes lower.

In view of the above, it will be apparent to those skilled in the art from this disclosure that there exists a need for an improved display device. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a display device with which a switch member can be positioned precisely.

In accordance with one aspect of the present invention, a display device includes a display screen, a front cabinet, a rear cabinet and a switch member. The front cabinet surrounds the display screen and has a pair of front supporting portions. Each of the front supporting portions has a threaded hole and protrudes rearward from the front cabinet. The rear cabinet is attached to the front cabinet to cover a rear side of the display device and has a pair of rear supporting portions. Each of the rear supporting portions has a first through hole and protrudes forward from the rear cabinet at a location opposite each of the front supporting portion. The switch member is fixedly coupled between the front cabinet and the rear cabinet with screws and has a pair of brackets. Each of the brackets has a second through hole and is sandwiched between each pair of the front supporting portion and the rear supporting portion. The screws are inserted through the first through holes of the rear supporting portions and the second through holes of the brackets and threaded into the threaded holes of the front supporting portions to fixedly couple the switch member between the front cabinet and the rear cabinet.

With the display device of the present invention, it is possible to provide a display device with which a switch member can be positioned precisely.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
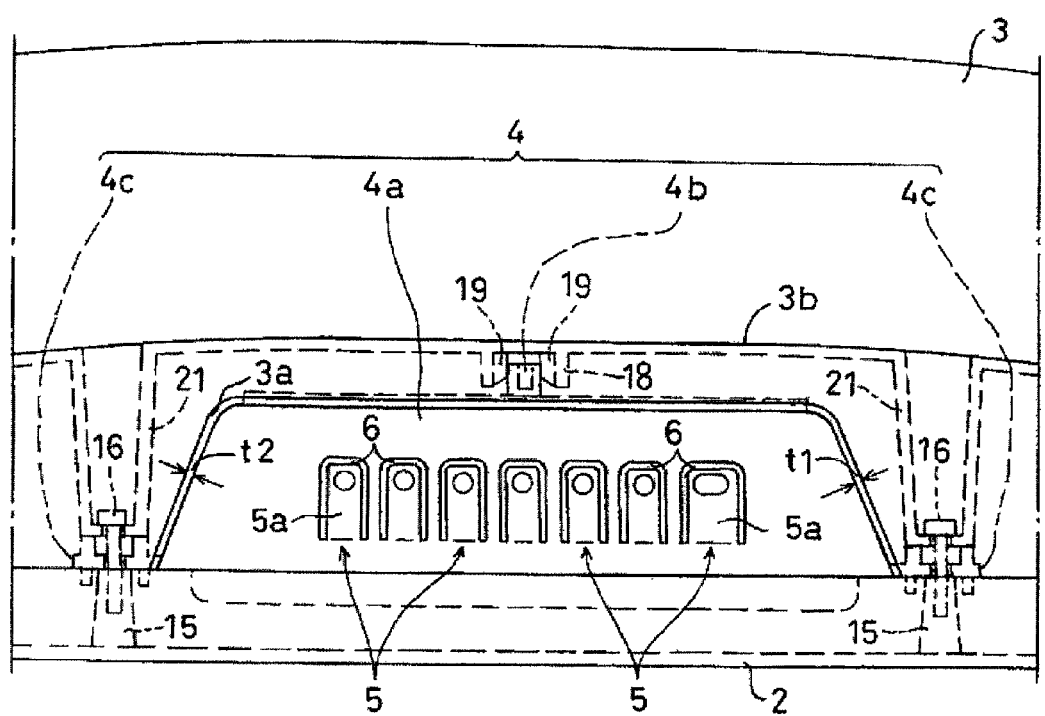
FIG. 1 is a partial top plan view of a display device in accordance with one embodiment of the present invention.

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

As shown in FIGS. 1-6, a flat panel display (e.g., display device), such as a liquid crystal television set or a liquid crystal monitor, includes a display screen 1, a front cabinet 2, a rear cabinet 3 and a switch member 4. The front cabinet 2 is disposed to surround the display screen 1. The rear cabinet 3 is attached to the front cabinet 2 to cover a rear side of the flat panel display. The switch member 4 is fixedly coupled between a top face of the front cabinet 2 and a top face of the rear cabinet 3. The switch member 4 switches operations of the power supply or the display screen 1.

As shown in FIGS. 1 to 5, the switch member 4 is formed from a synthetic resin. The switch member 4 has a trapezoidal switch member main body 4a, a hollow cylindrical component (e.g., protruding portion) 4b and a pair of brackets 4c. The switch member main body 4a includes a plurality of switches 5. The hollow cylindrical component 4b protrudes from a lateral middle portion of the switch member main body 4a toward the rear cabinet 3. The brackets 4c protrude laterally from both lateral side edges of the switch member main body 4a.

Figure 2:
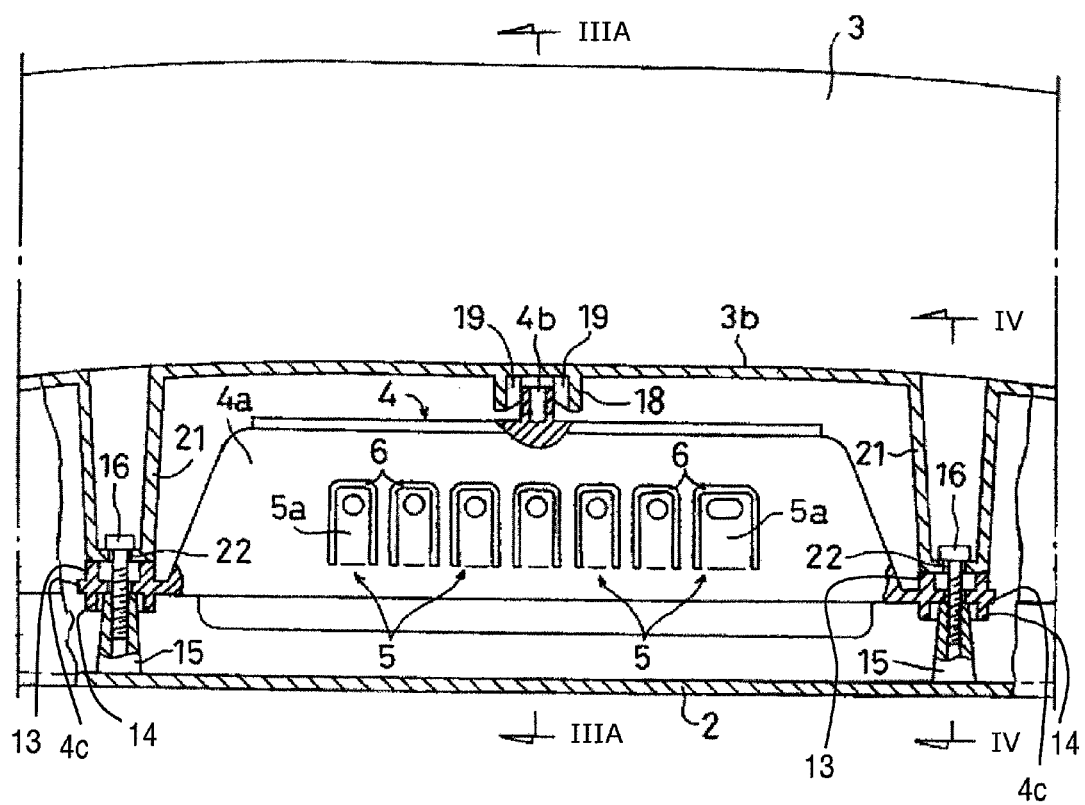
FIG. 2 is a partial cross sectional view of the display device in accordance with one embodiment of the present invention.
Figure 3A:
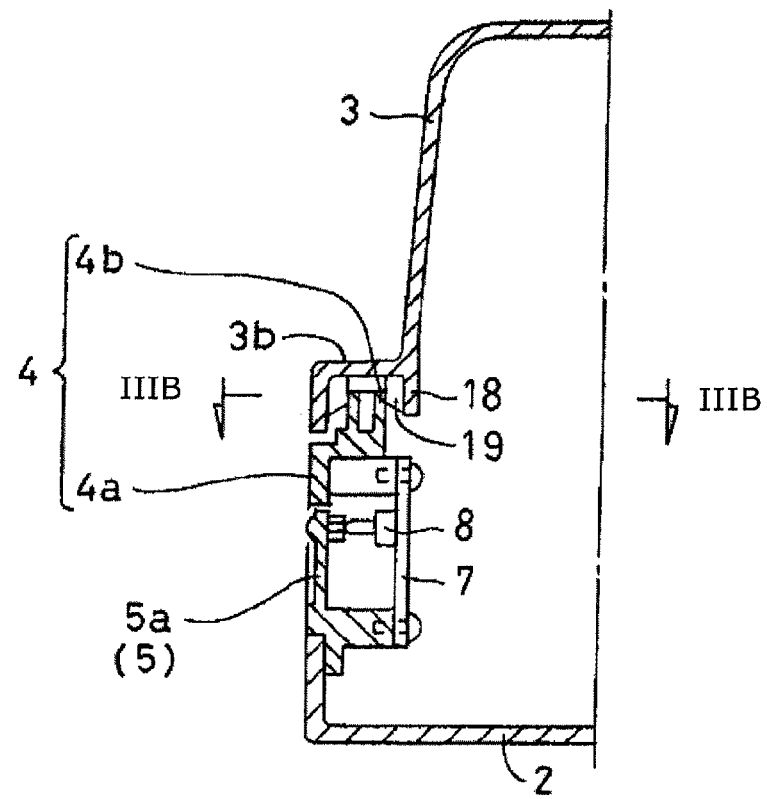
FIG. 3A is a cross sectional view of the display device taken along IIIA-IIIA line shown in FIG. 2.
Figure 3B:
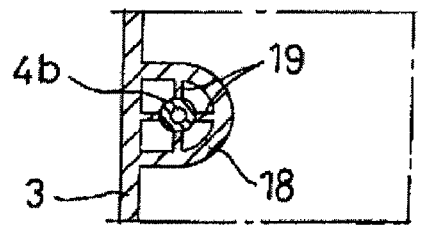
FIG. 3B is a cross sectional view of the display device taken along IIIB-IIIB line shown in FIG. 3A.
Figure 4:
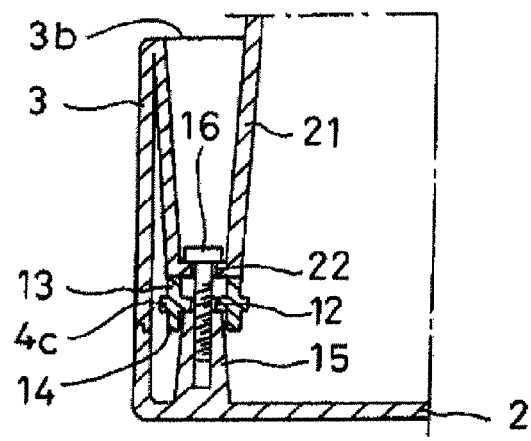
FIG. 4 is a cross sectional view of the display device taken along IV-IV line shown in FIG. 2.

As shown in FIGS. 1 and 2, the switches 5 have a plurality (seven in this example) of elastically deformable push tabs 5a. The push tabs 5a are formed by forming a plurality of substantially U-shaped slits 6 at a specific spacing in the switch member main body 4a. As shown in FIG. 3A, a printed wiring board 7 is screwed to a rear face of the switch member main body 4a. The printed wiring board 7 includes tact switches 8 at a location opposite the push tabs 5a. The display screen 1 or the power supply is switched by pushing one of the push tabs 5a to operate one of the tact switches 8.

Figure 5:
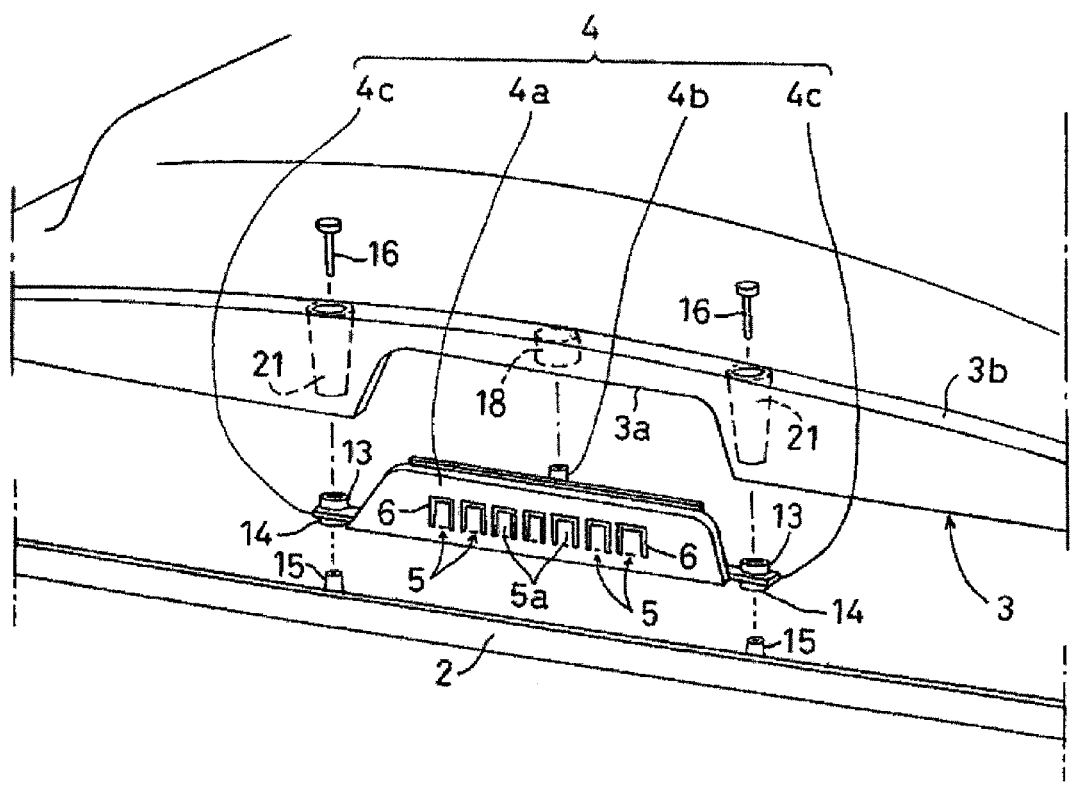
FIG. 5 is a partial exploded perspective view of the display device in accordance with one embodiment of the present invention.
Figure 6:
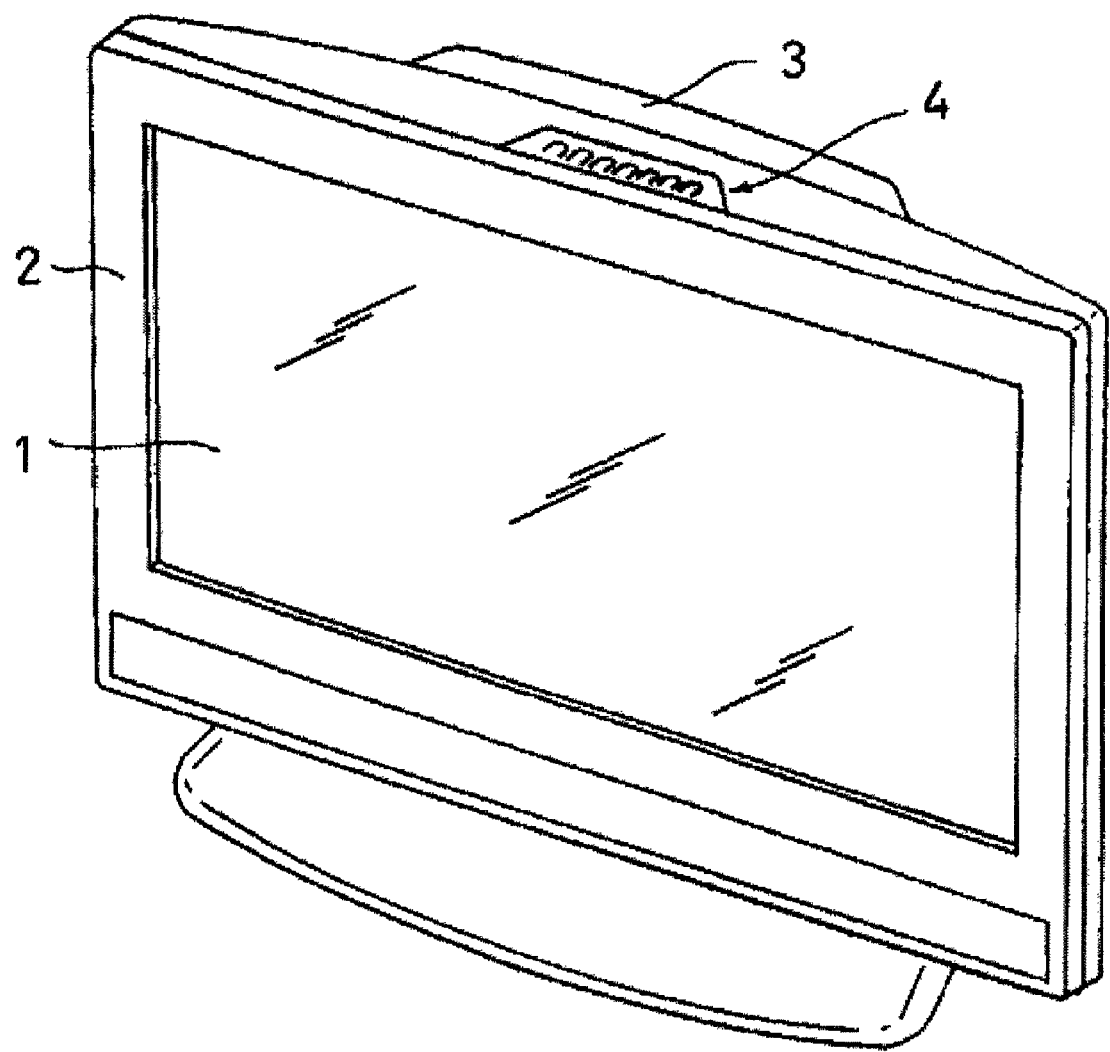
FIG. 6 is a perspective view of the display device in accordance with one embodiment of the present invention.

As shown in FIGS. 1, 2 and 5, each of the brackets 4c includes a screw insertion hole (e.g., second through hole) 12, a rear annular protrusion 13 and a front annular protrusion 14. The screw insertion hole 12 is formed in a center of each of the brackets 4c. The rear and front annular protrusions 13 and 14 are larger in diameter than the screw insertion holes 12. The rear and front annular protrusions 13 and 14 are formed integrally protruding from both sides of the brackets 4c and centered around the screw insertion holes 12.

The front cabinet 2 includes a pair of bottomed cylindrical legs (e.g., front supporting portions) 15. The bottomed cylindrical legs 15 are formed integrally on the front cabinet 2. The bottomed cylindrical legs 15 protrude rearward from the front cabinet 2. The bottomed cylindrical legs 15 support the brackets 4c by having distal ends fitted into the front annular protrusions 14. Each of the bottomed cylindrical legs 15 has a threaded hole.

As shown in FIGS. 1, 2 and 5, the rear cabinet 3 includes a recess 3a, a ledge 3b, a guide cylinder (e.g., cylindrical portion) 18 and a pair of bottomed cylindrical arms (e.g., rear supporting portions) 21. The recess 3a is formed at an edge of the rear cabinet 3 opposite the front cabinet 2. The recess 3a is substantially the same shape as, but larger than, the switch member main body 4a. When the rear cabinet 3 is abutted against the front cabinet 2, the recess 3a mates with the switch member main body 4a. The ledge 3b is formed opposite and substantially parallel to the front cabinet 2 by bending an outer peripheral part of the rear cabinet 3.

The guide cylinder 18 is integrally formed on the rear cabinet 3. The guide cylinder 18 protrudes from a rear face of the ledge 3b to face the cylindrical component 4b of the switch member 4. Several ribs 19 are integrally formed on an inner peripheral face of the guide cylinder 18. The ribs 19 protrude from the inner peripheral face at locations apart in a circumferential direction of the inner peripheral face. The guide cylinder 18 and the ribs 19 form a receiving portion mating with the cylindrical component 4b. Specifically, when the cylindrical component 4b is inserted to the guide cylinder 18, the ribs 19 contact with an outer peripheral face of the cylindrical component 4b to loosely mate the guide cylinder 18 with the cylindrical component 4b.

The bottomed cylindrical arms 21 are integrally formed on the ledge 3b of the rear cabinet 3. Specifically, the bottomed cylindrical arms 21 protrude from the ledge 3b of the rear cabinet 3 at locations opposite the legs 15 of the front cabinet 2. The bottomed cylindrical arms 21 have screw insertion holes (e.g., first through holes) 22 at flat bottom parts of the arms 21. The switch member 4 is sandwiched by the arms 21 and the legs 15 via the brackets 4c and the rear and front annular protrusions 13 and 14. Specifically, the brackets 4c are sandwiched between the arms 21 and the legs 15. More specifically, the flat bottom parts (e.g., distal ends) of the arms 21 are disposed on distal ends of the rear annular protrusions 13 and the legs 15 are located inside of the front annular protrusions 14 to contact with the brackets 4c when the brackets 4c are sandwiched between the arms 21 and the legs 15.

The assembly procedure will now be described. As shown in FIG. 2, the brackets 4c of the switch member 4 are placed on the legs 15. Then, the rear cabinet 3 is abutted against the front cabinet 2 so that the guide cylinder 18 is loosely mated with the cylindrical component 4b and the ribs 19 contact with the outer peripheral face of the cylindrical component 4b. Screws 16 are inserted through the screw insertion holes 22 of the bottomed cylindrical arms and the screw insertion holes 12 of the brackets 4c, and then threaded into the threaded holes of the legs 15. As a result, the rear cabinet 3 and the switch member 4 are fastened to the front cabinet 2. Specifically, the switch member 4 are laterally positioned with respect to the rear cabinet 3 and the front cabinet 2 by mating the cylindrical component 4b with the guide cylinder 18 and fastening the switch member 4 to the front cabinet 2 together with the rear cabinet 3.

With the flat panel display, the two screws 16 are inserted through the arms 21 of the rear cabinet 3 and the brackets 4c of the switch member 4, and then threaded into the threaded holes of the legs 15. Thus, heads of the screws 16 do not directly contact with the switch member 4. Thus, the switch member 4 is not laterally pushed. Specifically, even if the screws 16 are threaded clockwise, the switch member 4 is not pushed by the heads of the screws 16 and budged away from a predetermined position to the right side of the flat panel display. Thus, the switch member 4 can be kept in a state of being precisely positioned in the predetermined position, as shown in FIG. 1. Furthermore, left and right gaps t1 and t2 between the switch member main body 4a and the recess 3a can be evenly aligned. Thus, an attractive appearance can be maintained.

Moreover, the front cabinet 2 is fastened simultaneously with the fastening together of the switch member 4 and the rear cabinet 3 by the two screws 16. Therefore, the threading work can be carried out more efficiently.

Furthermore, the ribs 19 of the guide cylinder 18 contact with the cylindrical component 4b of the switch member 4 merely by abutting the rear cabinet 3 against the front cabinet 2. Since the middle part of the switch member 4 is securely linked with the rear cabinet 3, another screw is not necessary as in the past to fix the switch member 4 to the rear cabinet 3. Thus, the number of parts and the attendant cost are reduced correspondingly. Furthermore, since the work of threading in the extra screw is no longer necessary, work efficiency is also improved.

This approach is also more economical because the switch member used in the conventional display device can be used as the switch member 4 without modification.

In the above embodiments, an example was described in which the switch member 4 is disposed between the upper face of the front cabinet 2 and the upper face of the rear cabinet 3. However, the present invention is not limited to this structure. The switch member 4 can instead be disposed between a side face of the front cabinet 2 and a side face of the rear cabinet 3.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A display device comprising:
    a display screen;
    a front cabinet surrounding the display screen, and having a pair of front supporting portions, each of the front supporting portions protruding rearward from the front cabinet, each of the front supporting portions having a threaded hole;
    a rear cabinet attached to the front cabinet to cover a rear side of the display device, and having a pair of rear supporting portions, each of the rear supporting portions protruding forward from the rear cabinet at a location opposite a respective front supporting portion, each of the rear supporting portions having a first through hole; and
    a switch member fixedly coupled between the front cabinet and the rear cabinet with screws, and having a pair of brackets being sandwiched between each pair of the front supporting portion and the rear supporting portion, each of the brackets having a second through hole, the screws being inserted through the first through holes of the rear supporting portions and the second through holes of the brackets and threaded into the threaded holes of the front supporting portions to fixedly couple the switch member between the front cabinet and the rear cabinet,
    the switch member further having a protruding portion protruding rearward from the switch member, the protruding portion having a cylindrical shape, and
    the rear cabinet further having a receiving portion mating with the protruding portion, the receiving portion having a cylindrical portion protruding forward from the rear cabinet at a location opposite a respective protruding portion and a plurality of ribs being integrally provided to an inner peripheral face of the cylindrical portion at locations apart in a circumferential direction of the cylindrical portion and protruding inward from the inner peripheral face, the ribs contacting with an outer peripheral face of the protruding portion.

2. The display device according to claim 1, wherein
    the switch member further has a switch member main body having a plurality of switches,
    the protruding portion protrudes toward the rear cabinet from a lateral middle portion of the switch member main body, and
    the brackets protrude laterally from both lateral side portions of the switch member main body.

3. The display device according to claim 1, wherein
    each of the rear supporting portions has a bottomed cylindrical shape with the first through hole formed on a bottom portion of the rear supporting portion.

4. The display device according to claim 1, wherein
    each of the brackets has a front annular protrusion protruding forward from each of the brackets and a rear annular protrusion protruding rearward from each of the brackets.

5. The display device according to claim 4, wherein
    a distal end of each of the rear annular protrusions abuts against a distal end of each of the rear supporting portions.

6. The display device according to claim 1, wherein
    the switch member further has a cylindrical protruding portion that protrudes rearward relative to the switch member from a longitudinal middle portion of the switch member.

7. The display device according to claim 1, wherein
    the switch member has an outer face on which a switch portion is formed, the outer face of the switch member facing perpendicular to center axes of the second through holes, respectively.

8. The display device according to claim 1, wherein the switch member has an outer face on which a switch portion is formed, the outer face of the switch member facing perpendicular to center axes of the front supporting portions of the front cabinet, respectively.

9. The display device according to claim 1, wherein the switch member has an outer face on which a switch portion is formed, the outer face of the switch member facing perpendicular to center axes of the rear supporting portions of the rear cabinet, respectively.

10. The display device according to claim 1, wherein the front cabinet further has an upper face that faces in a first direction of the display device, and a side face that faces in a second direction of the display device, the first and second directions being perpendicular to each other;

the rear cabinet further has an upper face that faces in the first direction of the display device, and a side face that faces in the second direction of the display device; and the switch member is disposed either between the upper face of the front cabinet and the upper face of the rear cabinet, or between the side face of the front cabinet and the side face of the rear cabinet.

\* \* \* \* \*